L. T. ROBINSON & R. MILLER, Jr.
FILM HOLDER FOR OSCILLOGRAPHS.
APPLICATION FILED OCT. 29, 1908.
957,257.
Patented May 10, 1910.
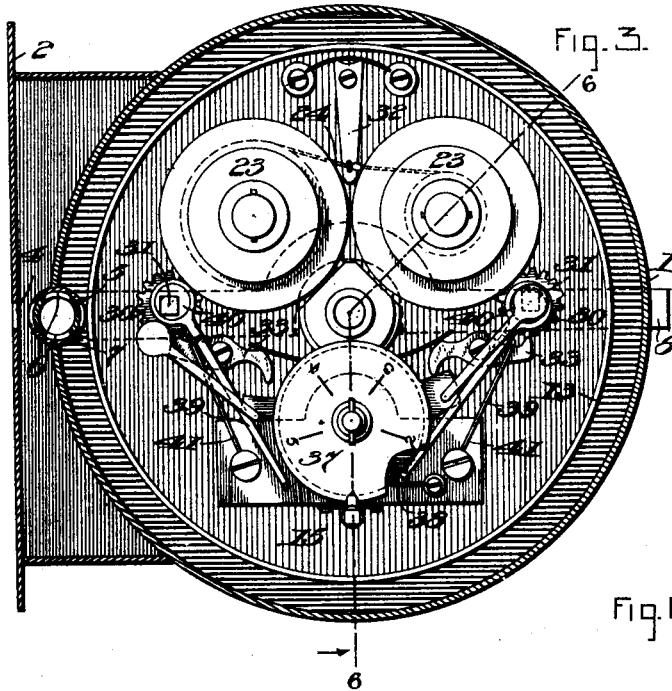
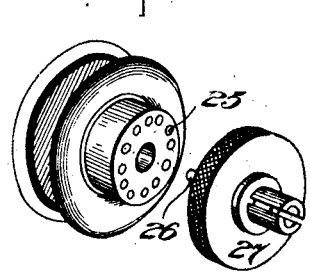
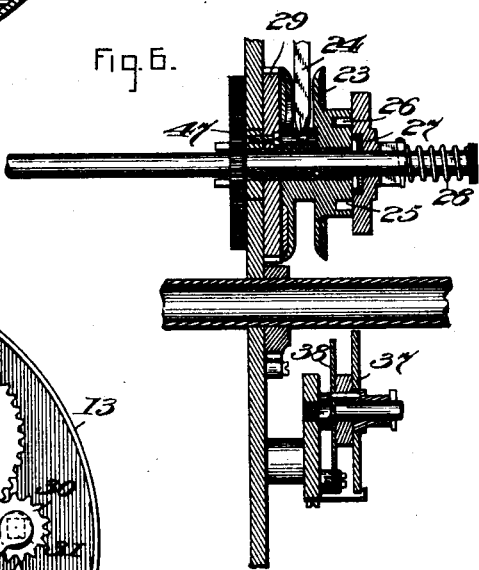
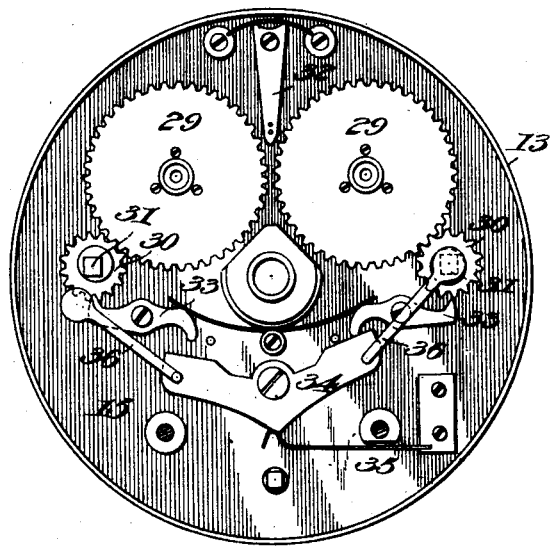
WITNESSES:
INVENTORS:
LEWIS T. ROBINSON
ROBERT MILLER JR
by
ATTY L. T. ROBINSON & R. MILLER, Jr.
FILM HOLDER FOR OSCILLOGRAPHS.
APPLICATION FILED OCT. 29, 1908.

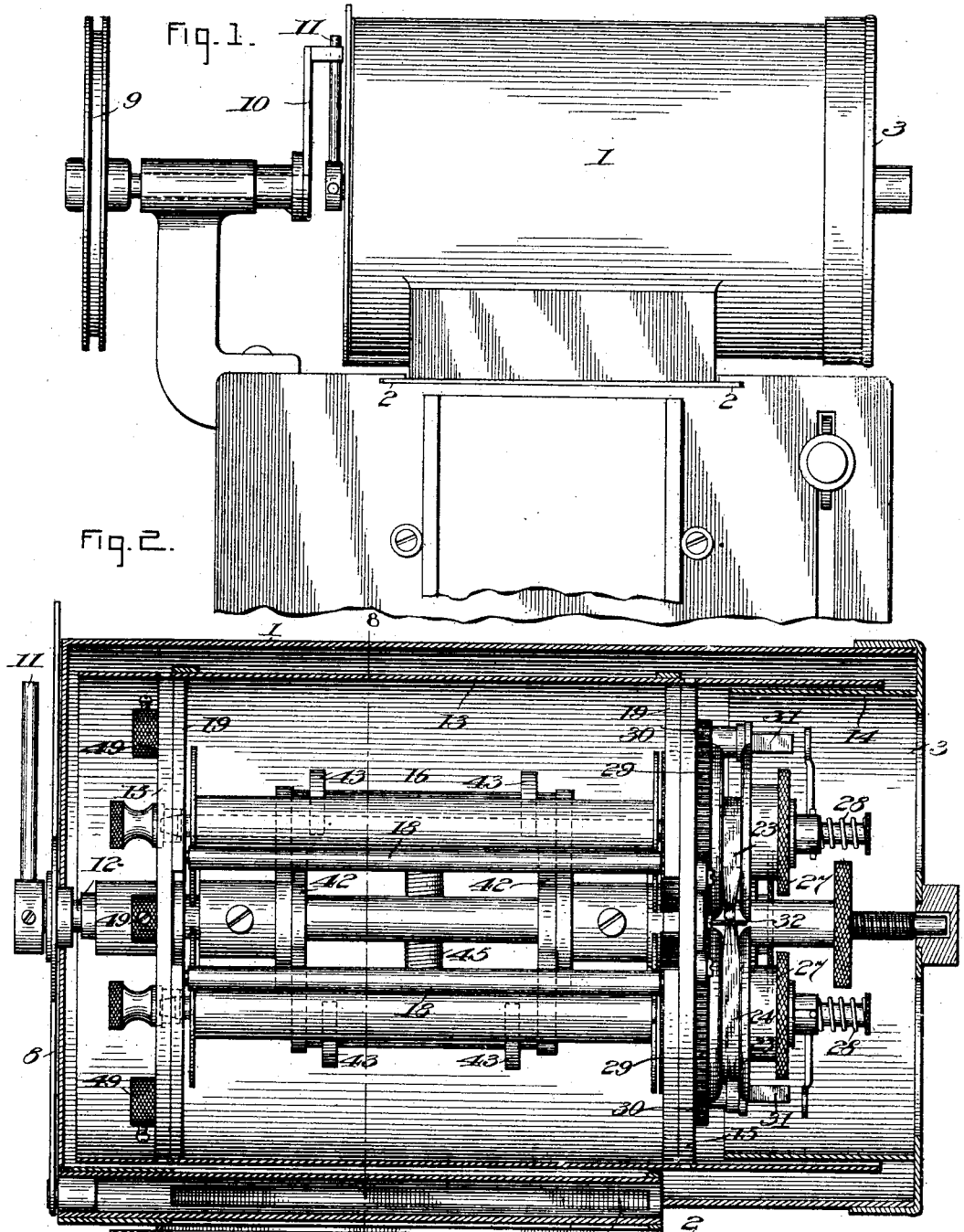

957,257.

Patented May 10, 1910.

WITNESSES:

INVENTORS:
LEWIS T. ROBINSON
ROBERT MILLER JR.

by

ATT'Y

UNITED STATES PATENT OFFICE.

LEWIS T. ROBINSON AND ROBERT MILLER, JR., OF SCHENECTADY, NEW YORK, ASSIGNORS TO GENERAL ELECTRIC COMPANY, A CORPORATION OF NEW YORK.

FILM-HOLDER FOR OSCILLOGRAPHS.

957,257.  Specification of Letters Patent.  Patented May 10, 1910.

Application filed October 29, 1908.  Serial No. 460,072.

*To all whom it may concern:*

Be it known that we, LEWIS T. ROBINSON and ROBERT MILLER, Jr., citizens of the United States, residing at Schenectady, county of Schenectady, State of New York, have invented certain new and useful Improvements in Film-Holders for Oscillographs, of which the following is a specification.

Our invention relates to film holders or carriers for instruments in which a record is made on a photographic film, and particularly to film holders for instruments such as oscillographs in which a photographic record is made upon a moving film.

Oscillographs and similar recording instruments have heretofore been provided with film holders comprising a light proof casing in which a rotatable cylinder carries a film on its periphery and the beam of light from the mirror of the galvanometer which forms part of the oscillograph passes into the casing and traces a record on the moving film. Film holders of this type are objectionable because each film is large enough for only one exposure and in order to place a fresh film on the holder it is necessary to take the holder into a dark room.

The object of our invention is to provide a movable film holder for oscillographs and similar recording instruments by means of which a number of exposures can be made without requiring the use of a dark room to change the films, which permits the exposed film to be removed and a fresh film to be inserted in daylight, which holds the film under uniform tension, during exposure, which permits the film to be shifted without strain on the film, which remains in running balance regardless of the position of the film, and which has numerous improvements, hereinafter more fully described, to facilitate the handling of the film.

In carrying out our invention the film, wound on a spool in a manner similar to the cartridge film used in the well-known kodak cameras, is mounted on a rotatable film holder and is connected to another spool on a second rotatable film holder, so that the film can be transferred from one spool to the other to permit a number of exposures to be made without inserting a new film.

The film holders are mounted in a movable carrier, preferably cylindrical in form, on which the film is stretched under uniform tension by any suitable tensioning device which engages the film and holds it close to the surface of the carrier. In order to permit the film to be shifted to bring a fresh surface into position for exposure the tensioning device is preferably arranged to be released during the shifting of the film, and in order to relieve the film from strain the rotary holders are connected by some suitable driving gear, which positively drives the holders in such a relation to each other that the film is transferred over the surface of the carrier from one holder to the other without any pull being exerted on the film.

The rotatable film holders are provided with a positive stop actuated in any suitable manner when the film has been completely transferred from one holder to the other to stop further movement of the holders and indicate to the operator that the film has been fully exposed, whereupon the exposed film may be removed and a fresh roll of film substituted in daylight, as in a kodak camera. The locking device for the rotatable holders is preferably actuated from the driving gear which maintains the holders in proper relation to each other.

The shifting of the film from one holder to the other may be accomplished in any suitable manner, preferably by actuating means for each holder controlled by a key similar to a clock key, which enables the operator to rotate the holders enough to wind up the exposed portion of the film and thereby bring a fresh portion into position for exposure. An indicating device is preferably used for indicating the distance to which the film has been shifted and the number of exposures which have been made, and this indicating device is preferably actuated from the driving mechanism for the rotatable film holders. Each film holder is provided with a ratchet and pawl for preventing rotation in the wrong direction and an interlock between the two actuating means controls the pawls in such a manner that the holders can be actuated only to transfer the film in the proper direction from one holder to the other.

Since it is sometimes desirable to rotate a film carrier at a high rate of speed and the transfer of the film from one holder to the other would tend to unbalance the carrier, an automatic balancing device is provided which automatically compensates for the unbalancing of the carrier caused by the shifting of the film, and is preferably actuated by the film as it is shifted from one holder to the other.

The invention is applicable wherever it is desired to shift a sheet of flexible material of any kind from one holder or spool to another, and in this specification we use the word "film" to include a flexible sheet of any material, which may or may not be sensitized for securing a photographic record.

Our invention will best be understood in connection with the accompanying drawings, which are merely illustrative of one form in which it may be embodied, and in which—

Figure 1 is a plan view of the device applied to an oscillograph or similar instrument; Fig. 2 is a longitudinal section of the device shown in Fig. 1 with parts of the interior in elevation; Fig. 3 is an end view of the device shown in Fig. 1 with the cover removed to show the indicator and the driving gear for the film holders; Fig. 4 is a view of the device shown in Fig. 3 with the driving gear for the film holders and the indicator removed; Fig. 5 is a detail view of the clutch between the driving gear on the rotatable film holder and the film holder; Fig. 6 is a section of Fig. 3 on the line 6—6; Fig. 7 is a view in elevation of the device for placing the film under tension; Fig. 8 is a cross-sectional view along the line 8—8 of Fig. 2 showing the drag mechanism for the film holders and the automatic balancing mechanism; and Fig. 9 is an end view of the carrier showing the removable cover which permits the insertion and removal of the film.

The specific form of device shown in the drawings is especially adapted for use in an oscillograph in which the film is mounted on a rotatable carrier, and comprises an open ended cylindrical casing 1, provided with flanges or lugs 2 for attaching it to the oscillograph or other instrument, and rendered light-tight by means of a cover 3 fitting snugly over the open end of the casing. A beam of light from the galvanometer mirror is admitted to the casing 1 through a slot 4 controlled by a shutter of any suitable type, but preferably made as shown in the drawings, in the form of a rotary valve comprising a tube 5 having a slot 6 cut through it to coöperate with a similar slot in the casing 7 in which the tube 5 rotates in response to a hand-lever 8. A driving wheel 9 mounted on the oscillograph adjacent the casing 1 actuates a rotatable arm 10, which in turn engages a similar arm 11 on shaft 12 mounted in suitable bearings in the casing 1, one of said bearings being formed in the cover 3.

As a result of this construction the shaft 12 may be rotated at any desired speed by the driving wheel 9 when the casing 1 is in position on the instrument.

The record of the movements of the galvanometer mirror is obtained by admitting a beam of light from the mirror through the shutter to a photographic film mounted upon any suitable movable support or carrier in the casing 1.

The preferred form of film support or carrier is a hollow cylinder or drum 13 mounted upon and rotating with the shaft 12. As shown in Fig. 2 the end of the cylinder or drum overlaps a rib or flange 14 on the cover 3 and thereby prevents the entrance of light into the casing except through the shutter. The cylindrical film support or carrier is closed near each end by heads 15 secured to the shaft 12 and supporting two rotatable film holders 16 in the form of shafts mounted parallel to each other and rotatably journaled at each end in the heads 15. On these rotatable film holders the spools for the roll of film are mounted, and the film is carried from one holder through an opening 17 in the carrier, as shown in Fig. 8, over the outer surface of the carrier and back through the opening to the other holder. By means of this construction the film is securely held at two points by being wrapped around the spools on the film holders, and may be shifted from one spool to the other by the rotation of the holders and thereby a number of exposures may be made, since the length of the film is several times greater than the circumference of the carrier.

In order to secure an accurate record it is desirable that the film be stretched under tension on its support to cause it to always bear the same relation to the source of light, and also that the film present as nearly as possible an uninterrupted cylindrical surface. In the specific form of device shown in the drawings it is advantageous to have the film very loose upon the carrier when it is shifted, since otherwise the friction between the film and the carrier would be great enough to subject the film to great strain.

The film may be held smoothly on the carrier under any desired tension by means of any suitable tensioning device which engages the film in such a manner as to draw it into snug engagement with the carrier, and preferably brings together the ends of the film to close up the gap in the carrier through which the film passes into and out of the carrier. In the preferred arrangement, as shown in Fig. 8, the film tensioning device comprises two rollers 18 mounted at opposite edges of the opening 17 upon two movable semicircular supports 19 fitting within the cylindrical carrier or drum 13 and pivoted on the shaft 12. As a result of this construction, the tensioning rollers 18 move along the circumference of the film carrier or drum 13 about the shaft 12 as a center and when moved toward each other engage the film between the two points at which it is supported by the film holders 16 and thereby draw the film down upon the carrier and put it under the desired tension, while the opening or gap 17 is practically closed when the rollers are close to each other, and thereby an uninterrupted film surface is obtained, which is especially desirable in investigating events, such as the automatic opening of a circuit, which are uncontrollable as to time and may occur just as a gap in the film surface is in a position to cause a loss of the record. The tensioning rollers 18 are actuated to put the film under tension or to leave it loose upon the carrier by any suitable actuating means, which preferably comprises as shown in Fig. 7, a tensioning shaft 20 provided at each end with a disk 21 having two pins mounted diametrically opposite each other to extend between the supports 19 and separate them when the tensioning shaft is rotated from the position shown in Fig. 7 by means of a key which engages the squared end of the shaft 20 projecting through one of the heads 15. The supports 19 are held in engagement with the pins on the disks 21 by springs 22, which also tend to separate the tensioning rollers to loosen the film and thereby permit it to slide freely over the carrier.

In order to shift the film from one film holder to the other without putting any strain on the film the two rotatable film holders are connected by any suitable driving gear which will positively rotate both rolls in a definite relation to each other and at such a relative speed that no pull is exerted on the film. Since the film is unwinding from one spool and is winding up on the other it is necessary that the driving gear between the film holders be arranged to vary the relative speeds of the holders at the proper rate. Various forms of variable speed driving gear between the two film holders may be used, but the preferred construction, as shown in the drawings, comprises two driving reels 23, one for each film holder, the two reels being connected by a flexible band or ribbon 24 of substantially the same thickness as the film, or as the film and its paper backing, if a film with backing is used. The hub of each reel is of approximately the same diameter as the spool on which the film is wound, hence as one film holder is rotated the flexible band or ribbon unwinds from the first reel and winds up on the second at the same rate that the film unwinds from the spool corresponding to the first reel and winds up on the other spool. Since the power for rotating the film holders is transmitted by the flexible band 24, the relative speed of the film holders automatically changes at such a rate that the shifting from one spool to the other is done without subjecting the film to the strain.

In order to permit the reels 23 to be set in the proper relation to the film on the film holders, an adjustable connection is provided between the reel and the film holder by means of which the angular relation of the reel to the film holders may be varied. The preferred construction for this purpose is any suitable clutch mechanism, preferably a positive clutch such as shown in Figs. 5 and 6, and formed by boring a number of holes 25 in the hub of each reel to receive a pin 26 carried upon a coöperating clutch member 27 which drives the corresponding rotatable film holder. Each clutch member is splined upon the rotatable film holder 16 and is normally held in engagement with the hub of the reel by means of a spring 28 surrounding the shaft or film holder 16, as shown in Fig. 6. The reels 23 are loosely mounted on the rotatable film holders 16 and each is provided with a driving mechanism comprising a gear wheel 29, which meshes with a pinion 30 mounted on a rotatable stud shaft 31 having a square end and rotatably mounted on the head 15. The operator can rotate either reel 23 by turning the corresponding pinion 30, and if one reel is rotated the other reel will be positively driven at the proper rate of speed through the flexible band or ribbon 24. The rotation of the reels is transmitted to the film holders through the clutch members 27 and since the film holders are rotatable independently of the reels when the clutch is disengaged, the reels and film holders can be set in such relation that the ribbon 24 rotates the reels at the proper relative speed to insure the transfer of the film from one holder to the other without strain on the film.

Overwinding of the reels and consequent injury to the flexible band 24 and to the film is prevented by means of an automatic stop mechanism, preferably operated by the flexible band of the driving gear between the reels. The specific form of stop mechanism shown in the drawings comprises a pivoted spring-pressed stop 32 mounted between the two gear wheels 29 and normally held by its spring out of engagement with either gear wheel. The stop as shown in Figs. 3 and 4 is provided with two pins, one on each side of the flexible band or ribbon 24, and as shown in Figs. 2 and 3, the ribbon is provided with a projection or knot which engages the pins upon the stop 32 and throws the stop into engagement with the gear wheel on the left when the ribbon is practically unwound from the reel on the right and thereby stops further movement of the reels. The ribbon is provided with a similar knot near the other end which protects the device when the ribbon is completely unwound from the reel on the left.

In order to insure that the film will always be moved in the same direction until it is completely transferred from one film holder to the other, spring-pressed pawls 33 are mounted on the head 15 in a position to engage the pinions 30, which act as ratchet wheels and by coöperating with the pawls prevent reverse movement of the stud shaft 31. It is necessary in order to permit the movement of the film that one of the pawls should be rendered inoperative when the other is in engagement with its coöperating pinion, and this result is attained by means of an interlock 34 pivotally mounted on the head 15 and normally held in one position or the other by means of a spring 35. As shown in Fig. 4 the interlock is proportioned to hold one pawl out of engaging position while the other is in engagement with its pinion. Further security against moving the film in the wrong direction is afforded by means of guards 36 mounted on the interlock 34 and arranged to cover the end of the stud shaft 31 corresponding to the pawl which is held out of engagement with its pinion. As a result of this construction the ribbon 24 and the film are protected from injury, as it is impossible for the operator to apply the turning key to the wrong stud shaft and the right stud shaft cannot be turned in the wrong direction.

It is desirable to have some kind of an indicator which will show the amount of film which has been shifted from one film holder to the other and thereby indicate the number of exposures which may be made. The ribbon 24 may be utilized as an indicator if it is properly graduated or marked, and many forms of indicating device actuated from any of the parts concerned in shifting the film may be used. The preferred form of indicator, shown in Fig. 3, comprises a dial 37 rotatably mounted on the head 15 and actuated from either of the stud shafts 31 by means of a ratchet wheel 38 secured to the dial and given a step by step rotation by means of oscillating pawls 39 driven from the stud shaft 31 by means of eccentrics 40. The parts are so arranged that the dial or indicator 37 is rotated in a counter-clockwise direction by either of the stud shafts, and in order to insure that the indicator will be moved only by the stud shaft to which the turning key is applied, the oscillating pawls 39 are held in engagement with the ratchet wheel 38 by means of springs 41, and one of the pawls is held out of operative position by the interlock 34 during the time the other is in engagement with the ratchet wheel for rotating the dial.

Since the two rotatable film holders are mounted in the rotatable drum or film support 13, the transfer of the film from one holder to the other will unbalance the carrier unless some provision is made to counteract this effect, and in accordance with my invention any suitable automatic balancing device is actuated in a definite relation to the film to overcome the unbalancing effect caused by the transfer of the film from one holder to the other, and thereby maintains the carrier or film support in running balance regardless of the amount of film on either holder. The specific form shown in the drawings comprises balancing arms 42 pivoted upon the shaft 12 and provided at one end with rollers 43 in engagement with the film and at the other end with balancing weights 44 pulled toward each other by a spring 45 which at the same time maintains the rollers 43 in engagement with the film on the film holders. If, for example, in the arrangement shown in Fig. 8, all the film is transferred from the right hand spool to the left hand spool, the roller 43 in engagement with the left hand spool will be moved downward and the balancing weight corresponding to that roller will be moved away from the shaft 12 to such a distance that it will exactly counteract the extra weight of film on the left hand holder, while at the same time the movement of the roller 43, which is in engagement with the film on the right hand holder, will cause its corresponding balancing weight to move to the right and also counter-act the effect of the decreased weight of film on the right hand holder. The film on the holders therefore actuates the automatic balancing mechanism to maintain the entire structure in running balance regardless of the relative amount of film on the two holders.

While the spools carrying the film are being placed in position, the film holders are prevented from rotating freely by any suitable means, such as spring-pressed restraining pawls 46, which engage gear wheels 47 on the film holders. The restraining pawls 46, which have round noses, permit rotation of the holders in either direction if sufficient force is applied, but will normally keep the film holder stationary against any slight disturbing force. The spools for the film are placed in position through one head of the drum 13, since one head 15 carries practically all of the mechanism for operating and controlling the film holders, while the other head, as best shown in Figs. 2 and 9, has a semicircular opening provided with a removable cover 48 held in place by thumb screws 49. This cover carries the bearings for one end of the rotatable film holders 16 and when removed permits the spools for the film to be placed in position on the film holders or to be removed from them. After the spools are in position on the film holders, the cover 48 is replaced, the ends of the rotatable film holders 16 engage the bearings on the cover and the device is ready for operation.

Our invention may be embodied in other forms than that shown and described and in many aspects is not limited to a device for handling a photographic film, since the improvements may be used in connection with any flexible sheet which is moved from one holder or spool to another, and we therefore do not wish to be restricted to the exact form shown but intend to cover by the appended claims all changes and modifications within the spirit and scope of our invention.

What we claim as new and desire to secure by Letters Patent of the United States, is—

1. In a film carrier, the combination with two rotatable film holders, of gearing between said holders comprising a reel connected to each holder, and a flexible band of substantially the same width as said reels and wound on both reels with one end secured to one reel and the other end secured to the other reel.

2. In a film carrier, the combination with two rotatable film holders, of a reel connected to each holder, and a ribbon of approximately the same thickness as the film fastened to and wound on both of said reels.

3. In a film carrier, the combination with two movable film holders, of positive variable speed gearing for actuating said holders in definite relation to each other and for varying progressively the relative speed of said holders, and a positive stop for one of said holders shifted by said gearing into locking position at a definite point in the movement of said gearing.

4. In a film carrier, the combination with two rotatable film holders, of gearing between said holders comprising a flexible band, and a lock thrown into engagement with either holder by said band.

5. In a film carrier, the combination with two movable film holders, of gearing for driving said holders in definite relation to each other, and a clutch between each of said holders and said gearing comprising a clutch member connected to each holder, and a coöperating clutch member rotated by said gearing independently of the first clutch member, one of said members having a plurality of recesses and the other a projection for entering any one of said recesses.

6. In a film carrier, the combination with two rotatable film holders, of gearing between said holders comprising a clutch member mounted to rotate independently of each holder, and a coöperating spring-pressed clutch member rigidly connected to each of said holders whereby the angular relation of said holders to each other may be varied.

7. In a film carrier, the combination with two rotatable film holders comprising shafts mounted parallel to each other, of gearing between said shafts, and a clutch for connecting each of said shafts to said gearing comprising coöperating clutch members mounted face to face and having projections on adjacent faces to interlock and thereby permit the angular relations of said members to each other to be varied.

8. In a film carrier, the combination with two rotatable film holders comprising shafts mounted parallel to each other, of gearing comprising a rotatable clutch member loosely mounted on each of said shafts, and a spring-pressed coöperating clutch member splined on each of said shafts.

9. In a film carrier, the combination with two movable film holders, of actuating means for each holder adapted to be operated by a key applied thereto and comprising ratchet mechanism for controlling the direction of movement of the holder, and means coöperating with both said ratchet mechanisms to compel either of said actuating means to move in a definite direction and simultaneously to leave the other actuating mechanism free to move in the same direction.

10. In a film carrier, the combination with two movable film holders, of actuating means for each holder comprising a rotatable pinion and a coöperating locking pawl to control the direction of rotation of said pinion, and an interlock between said pawls for throwing either pawl into locking relation to its pinion and simultaneously throwing the other pawl out of locking position.

11. In a film carrier, the combination with two rotatable film holders, of actuating means for each holder comprising a rotatable pinion, a spring-pressed pawl in engagement with each pinion, and a movable guard arranged to cover either pinion and simultaneously throw the pawl out of engagement with said pinion.

12. In a film carrier, the combination with two rotatable film holders, of actuating means comprising a rotatable pinion for each holder, of a locking guard arranged to cover the length of said pinions and simultaneously throw the pawl out of engagement with the covered pinion.

13. In a film carrier, the combination with two movable film holders, of a movable actuating member for each holder, an indicator, and driving connections between each of said actuating members and said indicator, whereby said indicator is moved by each of said actuating means.

14. In a film carrier, the combination with two movable film holders, of a rotatably mounted actuating member for each holder, an indicator mounted adjacent said actuating member, and means driven by said member for actuating said indicator.

15. In a film carrier, the combination with a film holder, of a film-tensioning device movable relatively to said holder, and means for locking said tensioning device in different positions relative to said holder to vary the tension of said film.

16. In a film carrier, the combination with two film holders for securing the film at different points, of a film-tensioning device for engaging said film between said points and mounted to move relatively to said holders, and means for moving said device relatively to said holders to vary the tension of said film.

17. In a film carrier, the combination with two film holders for holding said films at different points, of two relatively movable film guides in engagement with said film between said points, and means for moving said guides to vary the tension of the film.

18. A film carrier comprising a film support, two film holders mounted adjacent said support, and a film-tensioning device mounted to move relatively to said holders to stretch a film over said support.

19. A film carrier comprising a hollow support for the film, two film holders mounted in said support, a roller mounted inside said support to move relatively to said holders and said support to engage said film between said holders, and means for moving said roller relatively to said support to stretch the film under tension on said support.

20. A film carrier comprising a cylindrical support for the film, a film holder mounted in said support, a tension device pivotally movable about the axis of said support to engage said film, and means for moving said tension device about the axis of said support to vary the tension of the film on said support.

21. A film carrier comprising a rotatable cylindrical support for the film, two film holders mounted in said support, oppositely-disposed tension rollers pivotally movable about the axis of said support to engage said film between said support and said film holders, and actuating means for causing said tension rollers to move simultaneously about said axis to vary the tension of the film on said support.

22. A film carrier comprising a rotatable support, two rotatable film holders mounted in said support and each eccentric to the axis of rotation thereof, and automatic balancing means actuated as the film is transferred from one holder to the other to maintain said support in running balance.

23. A film carrier comprising a rotatable support, two rotatable film holders mounted in said support, and pivoted balancing arms moved about the axis of said support by the film as the film is transferred from one holder to the other.

24. A film carrier comprising a rotatable support, two rotatable film holders mounted in said support, and pivoted arms intersecting at the axis of said support, each arm engaging at one end the film on a film holder and having a balancing weight at the other end, whereby said weights are moved to balance said support as the film is transferred from one holder to the other.

25. A film carrier comprising a rotatable support, two rotatable holders mounted in said support, pivoted balancing arms engaging the films and intersecting at the axis of said support, and a spring connected to said arms to hold them in engagement with the film on said holders.

26. In a photographic film holder, the combination with a casing having one end open, a film carrier movably mounted in said casing, and control means for the film mounted on the end of said carrier adjacent the open end of said casing, of a removable cover for the end of said casing having openings to permit access to said control means and means on said cover for preventing light from said openings reaching the surface of said carrier.

27. In a photographic film holder, the combination with a rotatable film carrier having an overhanging end, of a casing for said carrier, and a removable cover for said casing having an annular rib which telescopes within the end of said carrier when said cover is on said casing.

28. In a photographic film holder, the combination with a cylindrical rotatable film carrier having an overhanging end and controlling means for the film mounted within said overhanging end, of a casing for said carrier, and a removable cover for said casing having an annular rib which telescopes within the end of said carrier when said cover is on said casing, said cover being provided with openings within said rib to permit access to said control means.

In witness whereof, we have hereunto set our hands this 27th day of October, 1908.

LEWIS T. ROBINSON.
ROBERT MILLER, Jr.

Witnesses:
BENJAMIN B. HULL,
HELEN ORFORD.